April 25, 1944.  G. F. PARKIN ET AL  2,347,634
HAND WHEEL FOR VALVE AND THE LIKE
Filed Sept. 18, 1943
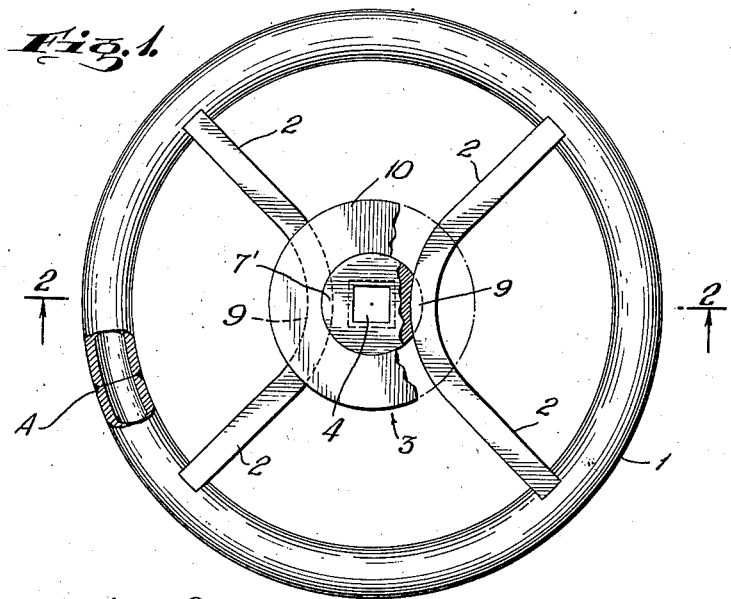
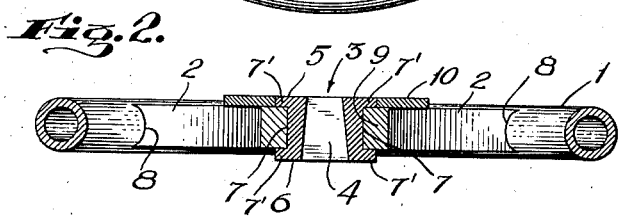
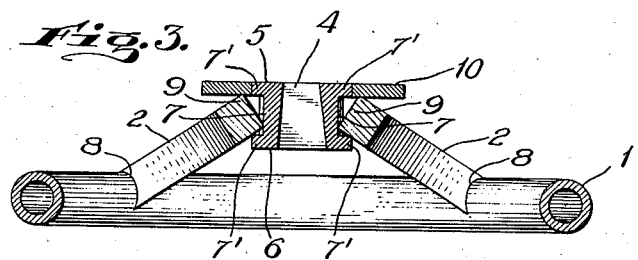
INVENTOR
GATES F. PARKIN
LESLIE A. BROWN
BY
ATTORNEYS Patented Apr. 25, 1944

2,347,634

UNITED STATES PATENT OFFICE 2,347,634

HANDWHEEL FOR VALVES AND THE LIKE

Gates F. Parkin and Leslie A. Brown, Meriden, Conn., assignors to International Silver Company, Meriden, Conn., a corporation of New Jersey Application September 18, 1943, Serial No. 502,934

4 Claims. (Cl. 74—552)

This invention relates to hand wheels for valves.

One object of the invention is a novel and improved construction of a hand wheel for valves.

A further object of the invention is a novel and improved hand wheel for valves which is characterized by its simplicity in construction and assembly and the economy with which it may be manufactured in quantity production.

Further objects of the invention will hereinafter appear.

For a better understanding of the invention reference may be had to the accompanying drawing forming a part of this application wherein, Fig. 1 is a front view of a hand wheel embodying the invention, showing certain of the parts broken away and in section;

Fig. 2 is a section along the line 2—2 of Fig. 1;

Fig. 3 is a view illustrating a step in the assembly.

Referring to the drawing the hand wheel chosen for illustrating the invention comprises a rim 1, a multiplicity of pairs of spokes 2 and a hub structure 3. Each pair of spokes is formed integrally of a single strip of metal. The rim 1 is made of any suitable material, as for example steel, and may be tubing or solid rod. In the preferred form it is formed of tubing bent to circular shape and welded at the seam A. The hub structure 3 is provided with a slightly tapered square opening 4 for mounting on a shaft to be turned. Intermediate its end surfaces 5 and 6 it is provided with a multiplicity of slots or recesses 7, which stop short of the end surfaces 5 and 6 by a distance measured by the shoulders 7'. These are adapted to accommodate and receive the intermediate curved parts 9 of the integrally formed pairs of spokes 2. The end of each spoke is recessed as indicated at 8 to correspond to the contour of the rim, in the embodiment shown, a circular recess. As indicated, the recesses 7 in the hub structure are formed to accommodate and receive the convex intermediate parts 9 of the pairs of spokes 2, while the ends of the spokes 2 are shaped and milled to make a tight fit with the inner surface of the rim 1. The arrangement is such that in the assembled position shown in Figs. 1 and 2, the rim, hub and spokes are held rigidly together against displacement, the ends of spokes 2 being held against the inner surface of the rim by the hub in the recesses 7 of which the intermediate curved parts of these pairs of spokes are locked against movement in all directions.

The hub structure also includes a flange 10 disposed on one end thereof and this flange, in the particular embodiment shown, is in the form of a separate washer-like member which is of the same thickness as that of the shoulders 7' formed at the ends of the hub structure where the recesses 7 are formed. These shoulders 7' form the side walls of the recesses 7 and decrease in depth toward the ends of the slots 7. The widths of the spokes are just sufficiently smaller than the width of the recesses 7 so as to permit ready assembly of the hub and the spokes with the intermediate or bent parts of the pairs of spokes fitting snugly in these recesses, and with the rim, the spokes and the hub structure including the flange or washer member 10 assembled as shown in Figs. 1 and 2.

The parts are fastened together by brazing, welding, or other method. The ends of the spokes 2 are fastened to the inner surfaces of the rim 1, and the intermediate parts 9 are fastened in the recesses 7 of the hub and to the shoulders 7' and to the washer or flange member 10. The latter fits tightly against one side of the spokes and about the hub to form a part of it when fastened to the hub and the sides of the spokes. The flange 10 binds the hub and spokes together into a strong rigid assembly; it extends a considerable distance radially outward from the center and therefore distributes the strains over a much larger area of the spokes than would be afforded by the hub and hub shoulders 7' alone. The whole wheel is formed of a minimum of parts, namely the rim, the hub structure including the reinforcing flange or washer 10, and the spokes. The wheel may be provided, if desired, with a second flange 10 on the other side of the wheel which would add to the strength.

Each pair of integrally formed spokes 2 embraces an arc of the rim equal to 360° divided by twice the number of pairs of spokes. The number of pairs of spokes depends generally upon the size or diameter of the wheel. In the smaller wheels two pairs of spokes are sufficient, as for example, as illustrated in the drawing wherein each pair of spokes embraces an arc of 90° which results in a 90° spacing of the spokes all the way around.

The assembly of the wheel parts may be very easily effected. Fig. 3 illustrates a step in the method of assembly. The rim, the spokes and the hub with washer may be loosely assembled as shown with the hub out of the plane of the rim and with the intermediate curved parts 9 of the integral spokes resting in the recesses 7 or rather with one edge of the intermediate parts 9 resting therein and bearing against the bottom of the recesses. As shown, the washer is mounted on the hub; however it may be rested on the periphery of the hub and assembled simultaneously with the other parts. With the parts thus loosely assembled, they may be sprung into the position with the spokes 2 and the hub disposed in the plane of the rim as illustrated in Fig. 2. Force is applied to effect the required relative movement of the hub and the rim. Jigs or any other suitable equipment may be used for holding the hub and the rim and springing the hub from the position shown in Fig. 3 to the position in the plane of the rim with the intermediate parts 9 of the spokes 2 resting in the recesses 7 formed in the side of the hub. After assembling and springing the parts into place the fastening of the parts together at their points of engagement may be effected in any conventional manner.

These wheels are thus characterized by their simplicity in construction and in assembly, the parts requiring a minimum of machining and working operations to form them. For example, it is a simple matter to form the rim. The spokes which may be of strip metal are cut to length with the ends shaped so as to fit the rim, then bent to form the desired angle between the spokes 2, depending upon the number of spokes to be employed in the wheel. The hub is cut to length, drilled, broached and swedged and the reinforcing flange 10 is formed by blanking and piercing. The recesses or slots 7 formed in the sides of the hub function to lock the spokes between the inner surface of the rim 1 and the hub and with all the parts fastened in assembled position as described above, a particularly rugged and strong wheel is obtained.

We claim:

1. A hand wheel of the character set forth comprising a rim, multiple pairs of integrally formed spokes having their outer ends recessed to fit the interior surface of the rim, a hub structure having curved recesses formed on the side thereof, one recess for each pair of integrally formed spokes, the intermediate parts of said integrally formed spokes being disposed in said recesses, said spokes, rim and hub being disposed in a common plane and an annular reinforcing flange fitting on to one end of said hub and being of the same thickness as shoulders formed on the periphery of said hub by said recesses, all of said parts being rigidly fastened at their points of engagement and said reinforcing flange lying flat against the sides of intermediate parts of said spokes for binding the hub and spokes together into a strong structure and distributing the strain over the hub throughout the area of the contact of the flange with the sides of said spokes.

2. A hand wheel of the character set forth comprising a rim, a hub and multiple pairs of integrally formed spokes, the intermediate part of a pair of spokes being formed into a gradual curve diverging outwardly from the hub and said hub being provided with slots intermediate its ends corresponding in shape to the curves of the intermediate parts of the spokes and receiving the same, said slots forming shoulders for engaging the sides of the intermediate part of the pairs of spokes, the ends of said spokes having recesses conforming to the interior surface of the rim, and a strain-distributing flange carried by one end of the hub and securely fastened to the sides of the spokes so as to form a continuation of the inner holding surfaces of said shoulders.

3. A wheel of the character set forth comprising a rim, a hub having holding slots formed in the periphery thereof and pairs of integrally formed spokes, a pair for each of said slots and the spokes of a pair embracing a section of the rim equal to 360° divided by twice the number of pairs of spokes, said spokes having recesses in their ends corresponding to the inner surface of the rim and the inner part of the hub and spoke structure being reinforced by a washer fastened to the periphery of the hub and fastened to the sides of the spokes, the latter having plane side surfaces for engaging said flange.

4. A wheel of the character set forth comprising a hub, a rim, pairs of integrally formed spokes having their intermediate parts fastened to the hub and their ends fastened to the rim, said hub being provided in the periphery thereof with locking and holding slots for the reception of the intermediate parts of said pairs of spokes respectively, and a reinforcing flange fastened to one end of the hub and to the sides of the pairs of spokes.

GATES F. PARKIN.
LESLIE A. BROWN.